April 2, 1946.   C. S. ASH   2,397,719
WHEEL
Filed Dec. 29, 1942   2 Sheets-Sheet 1

INVENTOR.
Charles S. Ash,
BY
ATTORNEY

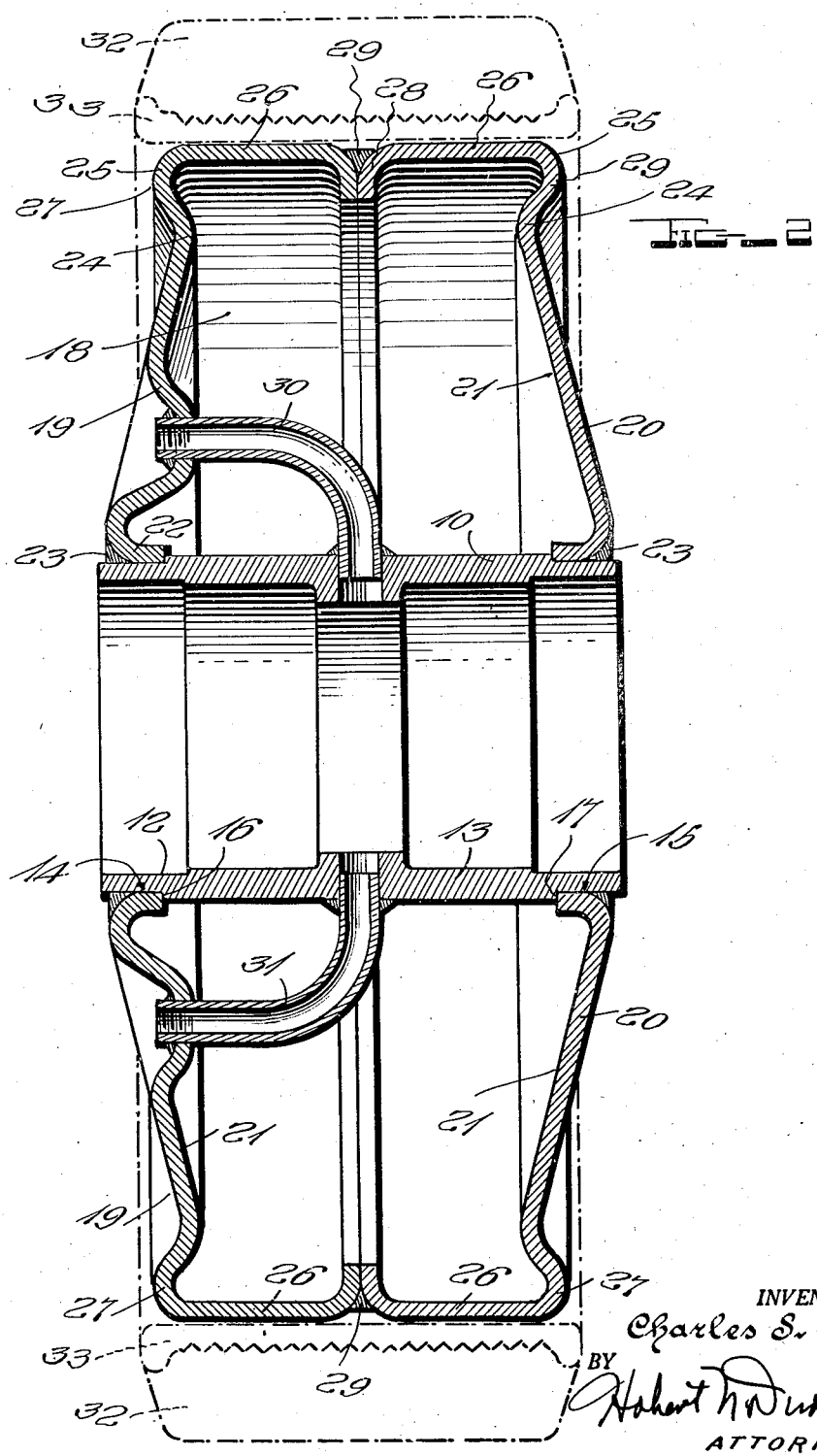

Patented Apr. 2, 1946

2,397,719

UNITED STATES PATENT OFFICE 2,397,719

WHEEL

Charles S. Ash, Milford, Mich.

Application December 29, 1942, Serial No. 470,436

1 Claim. (Cl. 305—1)

The present invention relates to new and useful improvements in wheels, and particularly idler and bogie wheels for tanks and other vehicles having endless tracks.

Objects and advantages of the invention will be set forth in part hereinafter and in part will be obvious herefrom, or may be learned by practice with the invention, the same being realized and attained by means of the instrumentalities and combinations pointed out in the appended claim:

The invention consists in the novel parts, constructions, arrangements, combinations and improvements herein shown and described.

The accompanying drawings referred to herein and constituting a part hereof disclose an exemplificate embodiment of the invention, and, together with the description, serves to explain the principle thereof.

In the said drawings:

Fig. 2 is a section on the line 2—2 of Fig. 1 through the wheel structure.

Figure 1:
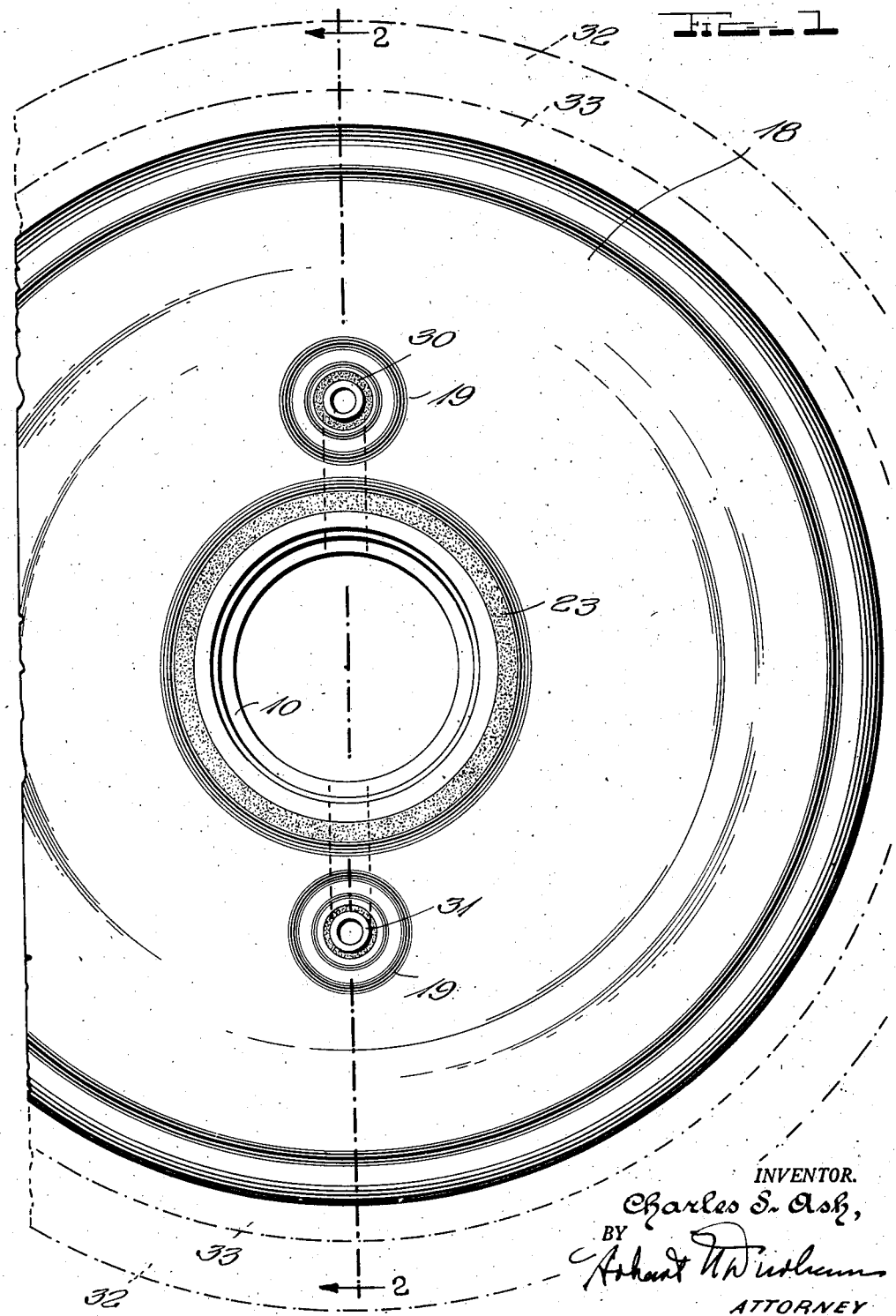
Fig. 1 is a side elevation of a wheel structure embodying the novel features of the invention.

The present invention has for its object the provision of an improved, simplified and strengthened tank wheel, the principles of which may be embodied in either a bogie wheel or idler wheel, which can be manufactured at a minimum of cost. A further object is the provision of a tank wheel which will collect little mud or debris in running and which will retain its strength to a high degree when partially demolished. Still another object is the provision of a wheel for tanks and other vehicles which can be made principally from simple, substantially duplicate drawn parts or stampings, and can be readily and quickly assembled and united. Still another object is the provision of a compression-type wheel for tanks which is so constructed as to have parts in tension and parts in compression so as to give it maximum strength to withstand great strains from without, thus adapting it for highly efficient use as an idler wheel on which heavy strains fall. Still another object is to provide a wheel structure which adapts the parts to be easily, quickly and economically welded together.

As shown, the wheel comprises a tubular hub member 10 which has its ends interiorly finished to provide bearing seats 12 and 13 and has its outer surface finished adjacent its ends to provide abutment or seat surfaces 14 and 15 and associated shoulders 16 and 17. Mounted on the hub is a composite wheel body and rim structure 18 of any desired diameter and the rim portion of which may be of any required width, but which as shown is of a width approximately the same as the length of the hub 10.

This wheel body and rim structure comprise a pair of dished disks or load carrying members 19 and 20 arranged at opposite sides of the center of the wheel. Each disk has a frustoconical body portion 21 provided at its center or apex with a circular flange or sleeve 22 extending inwardly or toward the center of the wheel. The flanges or sleeves 22 of the respective disks are press-fitted tightly upon the seat surfaces 14 and 15 of the hub and abut against the shoulders 16 and 17 and are tack welded to the hub, as shown at 23.

From the sleeves 22 the frustoconical body portions proper of the disks 19 and 20 extend outwardly in converging relation toward each other to a point approximately three-quarters of the distance between the hub and their peripheries. Beyond this point and between the same and their peripheral edges the disks are first bent outward laterally, as at 24, toward the adjacent side of the wheel, thence laterally and radially outward, as at 25, and thence laterally inward or toward the wheel center, as at 26. These bends are serpentine shaped or extend on reentrantly curved lines and form circumferentially extending channeled resilient reinforcing portions or ribs 27 having their open or concaved sides facing inwardly or toward the wheel center and their closed or convex sides facing outwardly or toward the sides of the wheel.

As shown, the portions 26 extend toward each other so as to meet at a point in line with the vertical center of the wheel and have their meeting edges bent inward radially toward the hub in the form of abutment flanges 28 which are rigidly united, as by tack welding, as shown at 29. The portions 26 cooperate to form the rim of the wheel body, and the joined flanges 28 cooperate to form a stiffening ring about the inner circumference of the rim so formed, thus giving increased strength and rigidity to the rim and wheel center, while the channeled portions or ribs 27 serve to provide self reinforced relatively deep and wide supports for the rim at the sides of the wheel and between the rim forming portions 26 and the conical portions 21 of the disks forming with said channeled portions of the wheel body.

The above described construction, arrangement and mode of connection of the parts provide a wheel of great strength and resistance to compression and formed of simple, substantially duplicate drawn or stamped parts which can be easily, conveniently and quickly assembled and rigidly united by welding. It will be observed that the flanges 28 are first bent inwardly at their outer portions on curved lines, the curved portions being spaced apart and converging inwardly toward each other to form a substantially triangular annular welding recess lying in the plane of the rim, the flanges thence having their inner portions extending on straight lines and in lapping relationship to close the base of the recess and complete the formation of a Y-shaped stiffening ring. By this construction the welding material 29 when applied forms a triangular band which lies within the recess of the ring and wholly within the plane of the rim so as to offer no obstruction to the application of the band 33 and so as to cooperate with the curved branching portions of the flanges to form a joint adapted to resist to a maximum degree crushing stresses tending to cause inward bending or collapse of the rim. It will be further observed that the body portions of the conical disks diverge outwardly toward the hub and opposite sides of the wheel on straight lines, thereby further adding to the strength of the wheel and at the same time reducing the extent of surfaces on which mud or other debris may collect. It will also be observed that the parts are so connected as to mutually reinforce each other and to be so firmly bound together that the wheel may be damaged or even partially demolished without rendering it incapable of further use.

One of the conical disk members is apertured to receive grease fittings 30 and 31 disposed diametrically opposite each other and fitted into grease holes extending into the interior of the hub. These fittings are preferably welded to the disk and hub. One of the fittings is designed to serve as a grease supply fitting and the other as a grease relief fitting allowing excess grease to escape, and such fittings may be suitably check valved or otherwise constructed to serve these respective purposes.

In practice the parts may be assembled in a convenient manner by first welding the grease fittings to the hub, then forcing the disk 19 on the hub and welding it to the hub and grease fittings, then forcing the disk 20 onto the hub and welding it thereto, and finally welding the rim flanges 28 together.

The members 19 and 20 are preferably formed by stamping and drawing operations, and when so formed each is made from a single flat circular disk of metal. The central portion of the disk is pierced, bent and drawn in one direction to form the tubular portion 22, the conical portion 21 is bent from the flat disk, and the portions 24 and 25 are likewise bent and the portions 26 drawn in the direction opposite the tubular portion 22. In this way, the portions 21 and 22 are left in a state of tension, while the portions 24, 25 and 26 are left in a compressed state, thereby greatly increasing the stability of the wheel body, the parts of which are bound in such states by the welded connections.

The rim of the wheel as thus constructed may be equipped with a wear band or tread tire of steel or other long-wearing material press-fitted and welded or otherwise fixed thereon, or it may be equipped with a solid rubber tire 32 vulcanized to a tire-holding band or rim 33, as indicated in dotted lines in Fig. 1, which tire and band unit may be suitably secured in position on the wheel rim to adapt the same to be assembled and disassembled to replace the rubber when it is worn out, or other types of rims and tread tires may be employed, according to the use to which the wheel is to be put.

According to the diameter of the wheel, length of the hub and relative width of the rim, the spacing of the disks and their points of attachment to the hub may vary, and the extent and direction of inclination of the body portions of the disks may vary as may be required to suit such changes in the proportions of the parts of the wheel.

It will be understood that while the portions 27 act as braces they also, due to their curvatures, give a certain amount of springiness or flexibility to the wheel, to adapt it to yield under heavy shocks without danger of fracture. These curvatures being of fairly large radii allow flexibility without localizations liable to cause crystallization of the metal, as will be readily understood.

The great advantage of my improved wheel construction is that it may be used either as a bogie or idler wheel for tanks, that it is light in weight yet of maximum strength to effectually withstand the strains to which such wheels are subjected, and that the amount of material and welding required to make a strong wheel are reduced, thus securing economy of manufacture, and that the parts required are substantially duplicates and may be readily and quickly assembled to produce the wheel.

Having thus described my invention, I claim:

A wheel of the character described comprising a hub, and a pair of dished disks arranged one on each side of the vertical center of the wheel, said disks comprising sleeve-like inner portions extending toward each other and welded at their relatively outer ends to the hub, outer portions bent toward each other and having meeting edges bent inwardly to provide a Y-shaped stiffening ring, welding material in the recess forming by the branches of the ring welding said outer portions to each other to form the rim of the wheel, conical body portions converging toward each other outwardly from the hub and extending substantially on straight lines from the inner portions toward the rim forming portions a distance materially greater than one-half the radial distance between the hub and rim forming portions, and relatively shallow channeled reinforcing ribs extending on gently curved lines between and joining between the body portions of the disks with their rim forming portions.

CHARLES S. ASH.